U S011760891B2

United States Patent
Yoo et al.

(10) Patent No.: US 11,760,891 B2
(45) Date of Patent: Sep. 19, 2023

(54) INFRARED RAY TRANSMITTANCE INK COMPOSITION FOR INKJET, METHOD FOR PREPARING A BEZEL PATTERN USING THE SAME, THE BEZEL PATTERN USING THE SAME METHOD AND DISPLAY PANEL COMPRISING THE BEZEL PATTERN

(71) Applicant: LG Chem, Ltd., Seoul (KR)

(72) Inventors: Jaehyun Yoo, Daejeon (KR); Areum Kim, Daejeon (KR); Sungeun Park, Daejeon (KR); Joonhyung Kim, Daejeon (KR)

(73) Assignee: LG Chem, Ltd.

( * ) Notice: Subject to any disclaimer, the term of this patent is extended or adjusted under 35 U.S.C. 154(b) by 973 days.

(21) Appl. No.: 16/320,357

(22) PCT Filed: Aug. 11, 2017

(86) PCT No.: PCT/KR2017/008789
§ 371 (c)(1),
(2) Date: Jan. 25, 2019

(87) PCT Pub. No.: WO2018/070654
PCT Pub. Date: Apr. 19, 2018

(65) Prior Publication Data
US 2019/0264051 A1    Aug. 29, 2019

(30) Foreign Application Priority Data
Oct. 10, 2016 (KR) .................. 10-2016-0130523

(51) Int. Cl.
*C09D 11/322* (2014.01)
*C09D 11/326* (2014.01)
(Continued)

(52) U.S. Cl.
CPC ............ *C09D 11/322* (2013.01); *C08G 65/18* (2013.01); *C09D 11/101* (2013.01); *C09D 11/30* (2013.01);
(Continued)

(58) Field of Classification Search
CPC ..... C09D 11/322; C09D 11/30; C09D 11/326; C09D 11/101; C09D 163/00; C08G 65/18;
(Continued)

(56) References Cited

U.S. PATENT DOCUMENTS 9,915,765 B2  3/2018  Takishita et al.
10,001,704 B2  6/2018  Suwa et al.
(Continued)

FOREIGN PATENT DOCUMENTS

CN    101333354 A    12/2008
CN    101544103 A    9/2009
(Continued)

OTHER PUBLICATIONS

International Search Report for PCT/KR2017/008789, dated Nov. 24, 2017.
(Continued)

*Primary Examiner* — Ruiyun Zhang
(74) *Attorney, Agent, or Firm* — Lerner David LLP

(57) ABSTRACT

An infrared transmitting ink composition for inkjet, a method of forming a bezel pattern using the same, a bezel pattern manufactured thereby, and a display substrate comprising the same are disclosed. The ink composition may check alignment marks using an infrared camera and detect pressure marks by non-destructive inspection even after the bezel pattern thereof is printed on a display substrate, and also may improve the adhesion to the substrate and the performance of inkjet process. The infrared ray transmitting
(Continued)

ink composition for ink jet comprises a lactam black pigment, a dispersant, an epoxy compound, a vinyl ether compound, an oxetane compound, a photopolymerization initiator and an organic solvent.

17 Claims, 2 Drawing Sheets

(51) Int. Cl.
*C09D 163/00* (2006.01)
*G02F 1/1333* (2006.01)
*C09D 171/00* (2006.01)
*C09D 11/30* (2014.01)
*C09D 135/08* (2006.01)
*C08G 65/18* (2006.01)
*C09D 11/101* (2014.01)
*G02F 1/1335* (2006.01)

(52) U.S. Cl.
CPC .......... *C09D 11/326* (2013.01); *C09D 135/08* (2013.01); *C09D 163/00* (2013.01); *C09D 171/00* (2013.01); *G02F 1/1333* (2013.01); *G02F 1/133512* (2013.01); *G02F 2203/11* (2013.01)

(58) Field of Classification Search
CPC .............. G02F 1/1333; G02F 1/13512; G02F 2203/11
USPC ................................. 106/31.13, 31.14, 31.28
See application file for complete search history.

(56) References Cited

U.S. PATENT DOCUMENTS

| | | | |
|---|---|---|---|
| 10,032,818 B2 | 7/2018 | Nagase et al. | |
| 10,436,959 B2 | 10/2019 | Takishita et al. | |
| 2004/0048950 A1* | 3/2004 | Nishida .................. | C09D 11/30 523/160 |
| 2008/0257188 A1 | 10/2008 | Yokoi | |
| 2009/0035535 A1 | 2/2009 | Wachi et al. | |
| 2009/0268002 A1 | 10/2009 | Houjou | |
| 2010/0068407 A1* | 3/2010 | Jeremic ................ | C09D 11/101 522/170 |
| 2010/0163811 A1 | 7/2010 | Oh et al. | |
| 2013/0177719 A1 | 7/2013 | Tasaka et al. | |
| 2014/0332791 A1 | 11/2014 | Funyuu et al. | |
| 2015/0004374 A1 | 1/2015 | Nahm et al. | |
| 2015/0277224 A1 | 10/2015 | Yu et al. | |
| 2016/0108263 A1 | 4/2016 | Yoo et al. | |
| 2017/0198157 A1 | 7/2017 | Park et al. | |
| 2017/0227844 A1 | 8/2017 | Park et al. | |
| 2017/0263663 A1 | 9/2017 | Nagase et al. | |

FOREIGN PATENT DOCUMENTS

| | | |
|---|---|---|
| CN | 101770172 A | 7/2010 |
| CN | 103025839 A | 4/2013 |
| CN | 104950600 A | 9/2015 |
| CN | 105524526 A | 4/2016 |
| EP | 2774942 A1 | 9/2014 |
| EP | 3185054 A1 | 6/2017 |
| EP | 3133443 B1 | 3/2019 |
| JP | 2004339330 A | 12/2004 |
| JP | 2008081660 A | 4/2008 |
| JP | 2012188478 A | 10/2012 |
| JP | 2013147568 A | 8/2013 |
| JP | 2016109763 A | 6/2016 |
| JP | 2018004920 A | 1/2018 |
| JP | 2018087956 A | 6/2018 |
| KR | 20110112973 A | 10/2011 |
| KR | 20130016460 A | 2/2013 |
| KR | 20140039982 A | 4/2014 |
| KR | 20140110372 A | 9/2014 |
| KR | 20150143071 A | 12/2015 |
| KR | 20160037121 A | 4/2016 |
| KR | 20160037122 A | 4/2016 |
| KR | 20160071336 A | 6/2016 |
| TW | 201245875 A | 11/2012 |
| TW | 201331162 A | 8/2013 |
| TW | 201612639 A | 4/2016 |
| WO | 2014103628 A1 | 7/2014 |
| WO | 2015159655 A1 | 10/2015 |
| WO | 2016027798 A1 | 2/2016 |
| WO | 2016153894 A1 | 9/2016 |
| WO | 2018034082 A1 | 2/2018 |
| WO | 2018051940 A1 | 3/2018 |

OTHER PUBLICATIONS

Taiwanese Search Report for TW Application No. 106131404, dated Jun. 28, 2018.
Chinese Search Report for Application No. 201780041945.X dated Mar. 24, 2021, pp. 1-3.

* cited by examiner

[Fig. 1]
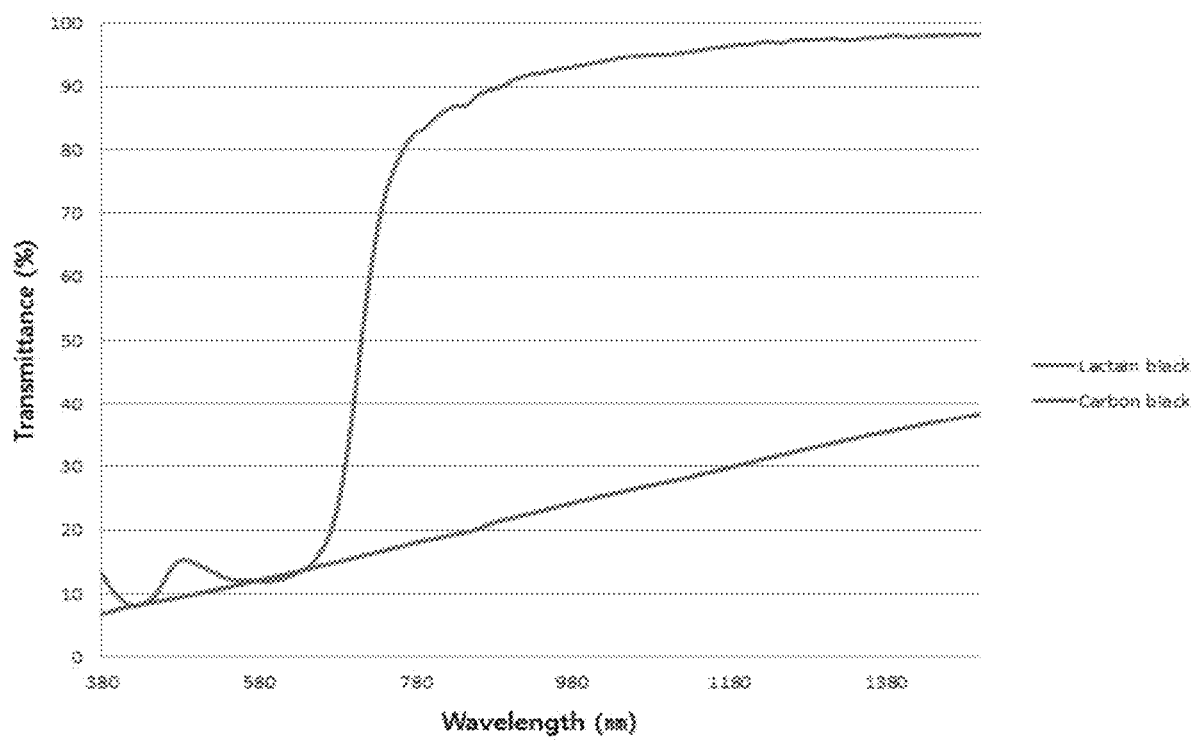
[Fig. 2]
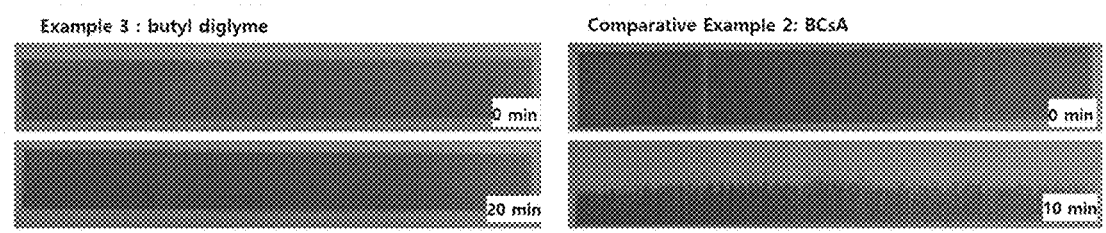

[Fig. 3]
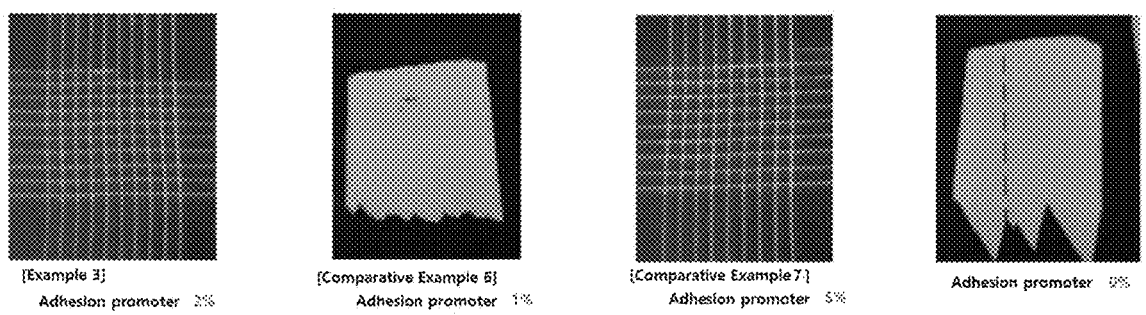
[Fig. 4]
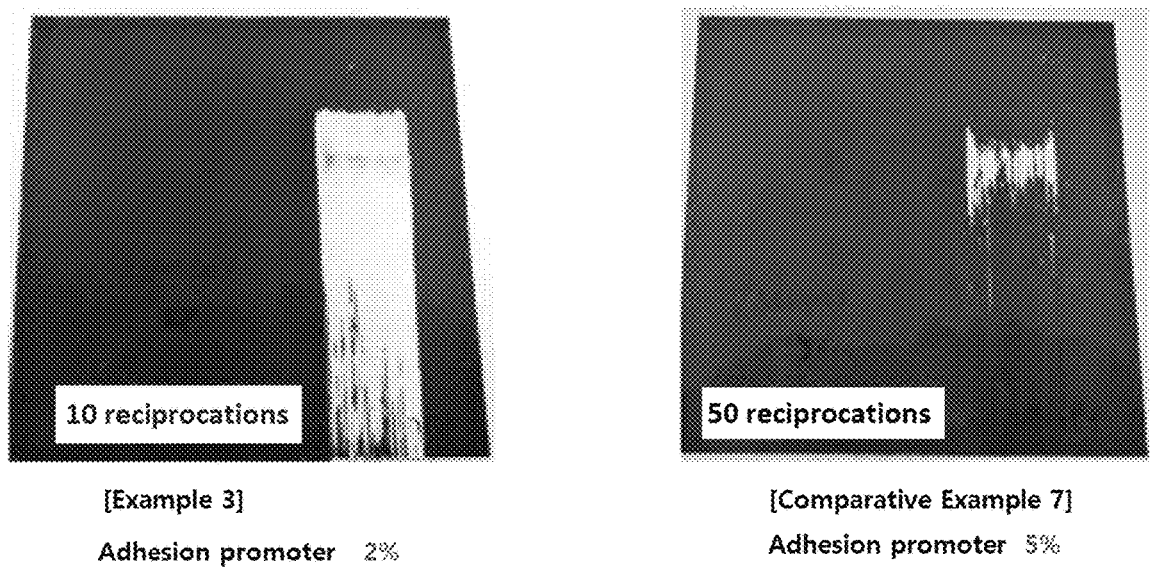

INFRARED RAY TRANSMITTANCE INK COMPOSITION FOR INKJET, METHOD FOR PREPARING A BEZEL PATTERN USING THE SAME, THE BEZEL PATTERN USING THE SAME METHOD AND DISPLAY PANEL COMPRISING THE BEZEL PATTERN

CROSS-REFERENCE TO RELATED APPLICATIONS

The present application is a national phase entry under 35 U.S.C. § 371 of International Application No. PCT/KR2017/008789, filed on Aug. 11, 2017 which claims priority from Korean Patent Application No. 10-2016-0130523, filed on Oct. 10, 2016, the disclosures of which are incorporated herein by reference.

BACKGROUND OF THE INVENTION

1. Field of the Invention

The present invention relates to an infrared transmitting ink composition for inkjet, a method for forming a bezel pattern using the same, a bezel pattern manufactured thereby, and a display substrate comprising the same. More specifically, it relates to an infrared transmitting ink composition for inkjet, which enables to check alignment marks using an infrared camera and detect pressure marks by non-destructive inspection even after a bezel pattern is printed on a display substrate and enables to improve the adhesion to the substrate and the performance of inkjet process, a method for forming a bezel pattern using the same, a bezel pattern manufactured thereby, and a display substrate comprising the same.

2. Description of the Related Art

Display devices such as TVs and mobile devices including smart phones, are being developed day by day in terms of originality and convenience. Along with this growth, there are also many demands and problems to be solved for improved convenience, and studies for solving these problems have been continuing. Among them, as a solution for improving the user's degree of immersion in screen, a narrow bezel which reduces unnecessary edges to secure a more extended screen is applied. As a result, a casing for a display panel becomes unnecessary, and research has been continued to hide the electrodes outside the display area of display device and to further reduce the visual difference between the display area and the non-display area. In addition, development of the ink which enables to exhibit excellent adhesion to the substrate and to improve the performance of inkjet process is also desired.

PRIOR ART DOCUMENT

[Patent Literature]
(Patent Document 1) Korean Patent Laid-open Publication No. 10-2013-0016460

As described above, in order to apply a narrow bezel for securing a more extended screen of the display device, studies for development of inks has been continued to hide the electrodes outside the display area of display device, to further reduce the visual difference between the display area and the non-display area, to exhibit excellent adhesion to the substrate and to improve the performance of inkjet process.

As a result of such studies, various ink compositions have been developed. However, in case of a black ink containing carbon black, there is a problem in that it printing is possible only after removing alignment marks for a post-process and testing of the sample is possible only after the sample is destroyed in order to detect pressure marks generated in the ACF bonding process. Further, in case of most of the inks, it is disadvantageous that the ink can be adhered to the substrate only after a post-process in which the heat treatment is performed.

SUMMARY OF THE INVENTION

It is therefore an object of the present invention to provide an infrared transmitting ink composition for inkjet, which enables to check alignment marks using an infrared camera and to detect pressure marks by non-destructive inspection after the ACF bonding, even after a bezel pattern is printed on a display substrate, a method for forming a bezel pattern using the same, a bezel pattern manufactured thereby, and a display substrate comprising the same.

It is another object of the present invention to provide an infrared transmitting ink composition for inkjet, which has excellent adhesion to the substrate and can improve the performance of inkjet process, a method for forming a bezel pattern using the same, a bezel pattern manufactured thereby, and a display substrate comprising the same.

In order to achieve the above object, the present invention provides an infrared transmitting ink composition for inkjet, comprising a lactam black pigment; a dispersant; an epoxy compound; a vinyl ether compound; an oxetane compound; a photopolymerization initiator; and an organic solvent.

Further, the present invention provides a method for forming a bezel pattern using the infrared transmitting ink composition for inkjet, comprising the steps of: a) forming a bezel pattern by inkjet printing the infrared transmitting ink composition for inkjet on a substrate; and b) curing the bezel pattern by irradiation with radiation.

The present invention also provides a bezel pattern manufactured by the method of forming a bezel pattern.

The present invention also provides a display substrate comprising the bezel pattern.

Using the infrared transmitting ink composition for inkjet according to the present invention, the method for forming a bezel pattern using the same, the bezel pattern manufactured thereby, and the display substrate comprising the same, it is possible to check alignment marks using an infrared camera and to detect pressure marks by a non-destructive inspection after ACF bonding, even after a bezel pattern is printed on a display substrate, and also to improve the adhesion to the substrate and the performance of inkjet process.

BRIEF DESCRIPTION OF THE DRAWINGS

FIG. 1 is a graph comparing infrared transmittance of a bezel formed of the ink composition according to an example according to the present invention and a comparative example.

FIG. 2 is an inkjet printed image for evaluating performance of inkjet process of the ink composition prepared in an example according to the present invention and a comparative example.

FIG. 3 is a view showing how the degree of cross cut varies according to the content of the adhesion promoter contained in the ink composition of an example according to the present invention and a comparative example.

FIG. 4 is a view showing rework performance according to the content of the adhesion promoter contained in the ink composition of an example according to the present invention and a comparative example.

DETAILED DESCRIPTION OF THE INVENTION

The present invention will now be described in detail.

The infrared transmitting ink composition for inkjet according to the present invention comprises a lactam black pigment, a dispersant, an epoxy compound, a vinyl ether compound, an oxetane compound, a photopolymerization initiator and an organic solvent.

The lactam black pigment is a coloring agent that determines the infrared transmittance of the coating layer formed by curing the ink composition according to the present invention. It is impossible to use pigments such as carbon black and aniline black because the transmittance is very low due to blocking light of all wavelengths (light-shielding property). In contrast, using the lactam black pigment, the transmittance at an infrared wavelength is excellent, and therefore, even when a bezel pattern is printed on a display substrate, alignment marks and pressure marks can be detected using non-destructive infrared ray sensor such as an infrared camera.

The content of the lactam black pigment is 5 to 15% by weight, preferably 10 to 12% by weight, more preferably about 12% by weight based on a total weight of the ink composition. When the content of the lactam black pigment is less than 5% by weight with respect to the total weight of the ink composition, the light-shielding property of the bezel layer is lowered, so that electrodes of the non-display area may be visible. When the content of the lactam black pigment is more than 15% by weight, the viscosity of the ink may excessively increase, or the infrared ray transmittance may be lowered so that the function of the infrared ray sensor may be deteriorated.

Next, the dispersant is used to make the lactam black pigment particles of uniform size, and also to reduce the production time of the ink. As the dispersant, a polymeric, nonionic, anionic or cationic dispersant may be used, Examples thereof include acrylics, polyalkylene glycols and esters thereof, polyoxyalkylene polyhydric alcohols, ester alkylene oxide adducts, alcohol alkylene oxide adducts, sulfonic acid esters, sulfonates, carboxylic acid esters, carboxylates, alkylamide alkylene oxide adducts, and alkylamines. These may be used alone or in admixture of two or more. Among them, it is preferable to use an acrylic-based dispersant having excellent storage stability of ink.

The content of the dispersant is 0.5 to 5% by weight, preferably 1 to 3% by weight, and more preferably about 2% by weight based on a total weight of the ink composition. When the content of the dispersant is less than 0.5% by weight, the pigment may not uniformly dispersed. When it exceeds 5% by weight, the pigment may be aggregated or the curing sensitivity may be lowered.

The epoxy compound is obtained by a cationic polymerization and may be one or a mixture of two selected from alicyclic epoxy compounds containing cationic polymerizable alicyclic epoxy monomers. Such an alicyclic epoxy compound may contain one or two epoxidized aliphatic cyclic groups, wherein the epoxidized aliphatic cyclic group may be, for example, a compound which has an epoxy group formed in an alicyclic ring and the hydrogen atom of the alicyclic ring may be substituted with a substituent such as an alkyl group.

Examples of the alicyclic epoxy compound, that is, the epoxy compound include dicyclopentadiene dioxide, limonene dioxide, (3,4-epoxycyclohexyl) methyl-3,4-epoxycyclohexanecarboxylate, 3-vinylcyclohexene oxide, bis(2,3-epoxycyclopentyl)ether, bis(3,4-epoxycyclohexylmethyl)adipate, bis(3,4-epoxy-6-methylcyclohexylmethyl)adipate, (3,4-epoxycyclohexyl)methyl alcohol, (3,4-epoxy-6-methylcyclohexyl)methyl-3,4-epoxy-6-methylcyclohexanecarboxylate, ethylene glycol bis(3,4-epoxycyclohexyl)ether, 3,4-epoxycyclohexene carboxylic acid ethylene glycol diester, (3,4-epoxycyclohexyl)ethyltrimethoxysilane and the like, but are not limited thereto.

The content of the epoxy compound is 5 to 25% by weight, preferably 7 to 15% by weight, and more preferably about 10% by weight based on a total weight of the ink composition. If the content of the epoxy compound is less than 5% by weight, the curing sensitivity is lowered. If it exceeds 25% by weight, the viscosity of the ink may increase so that the performance of inkjet process may be deteriorated.

The vinyl ether compound, which is used for improving the curing sensitivity, is exemplified by 1,4-cyclohexanedimethanol divinyl ether, triethylene glycol divinyl ether (DVE-3), hydroxybutyl vinyl ether, and the like.

The content of the vinyl ether compound is 1 to 15% by weight, preferably 5 to 12% by weight, more preferably about 10% by weight based on a total weight of the ink composition. If the content of the vinyl ether compound is out of the above range, curing sensitivity may be lowered.

Next, the oxetane compound, which is a compound having a quaternary cyclic ether group in the molecular structure, is used for lowering the viscosity of the cationic polymerizable ink composition. Examples thereof include 3-ethyl-3-hydroxymethyl oxetane, 1,4-bis[(3-ethyl-3-oxetanyl)methoxymethyl]benzene, 3-ethyl-3-(phenoxymethyl) oxetane, di[(3-ethyl-3-oxetanyl)methyl]ether, 3-ethyl-3-(2-ethylhexyloxymethyl)oxetane, 3-ethyl-3-cyclohexyloxymethyl oxetane, phenol novolac oxetane and the like, and trade names of ARON OXETANE OXT-101, ARON OXETANE OXT-121, ARON OXETANE OXT-211, ARON OXETANE OXT-221 or ARON OXETANE OXT-212 available from Toagosei Co., Ltd., which may be used alone or in admixture of two or more.

The content of the oxetane compound is 25 to 50% by weight, preferably 30 to 45% by weight, and more preferably 39 to 41% by weight based on a total weight of the ink composition. If the content of the oxetane compound is less than 25% by weight, the viscosity of the ink may increase so that the performance of inkjet process may be deteriorated. If it exceeds 50% by weight, the curing sensitivity may be lowered.

The content of the organic solvent is 10 to 30% by weight, preferably 15 to 25% by weight and more preferably 20 to 22% by weight based on a total weight of the ink composition. If the content of the organic solvent is less than 10% by weight, the viscosity of the ink may increase or the thickness of the bezel layer may become thick. If it exceeds 30% by weight, the curing sensitivity may be lowered.

The organic solvent may be used without particular limitation as long as it has excellent curing sensitivity even after the bezel pattern is printed on the display substrate using the ink composition according to the present invention. However, in order to improve the performance of inkjet process, it is preferable to use the organic solvent having a boiling point of 200° C. or more and a viscosity of 1 to 5 cP, preferably 3 cP or less at 25° C.

Thus, in case that the lactam black pigment is contained in the total ink composition at a low content of less than 10% (especially 7% or less), there is no big problem in the performance of inkjet process even if an organic solvent such as ethylene glycol monobutyl ether acetate (BCsA) having a boiling point of less than 200° C. is used. However, if the above-mentioned lactam black pigment is contained in a relatively high content of 10% or more, the performance of inkjet process is degraded.

Therefore, in the present invention, it is required to use an organic solvent which enables to enhance or improve the performance of inkjet process. The performance of inkjet process is improved as the use of an organic solvent satisfying the conditions of high boiling point and low viscosity as described above (having a boiling point of 200° C. or higher and a viscosity of 1 to 5 cP, particularly 3 cP or less at 25° C.). Therefore, an organic solvent satisfying such conditions, for example, butyl diglyme (or diethylene glycol dibutyl ether), dipropylene glycol methyl ether acetate, ethylene glycol dibutyrate, diethyl succinate, and ethyl caprate should be used, and it is most preferable to use the butyl diglyme.

The photopolymerization initiator is a cationic polymerizable initiator. Specifically, the photopolymerization initiator is a compound generating cationic species or Bronsted acid by irradiation with ultraviolet rays and, for example, it comprises at least one of an iodonium salt or a sulfonium salt. The iodonium salt or the sulfonium salt may cause a curing reaction to form a polymer by reacting monomers having an unsaturated double bond contained in the ink during the ultraviolet curing process, and a photosensitizer may be used depending on the polymerization efficiency. For example, the photopolymerization initiator may include compounds having an anion represented by $SbF_6$—, $AsF_6$—, $BF_6$—, $(C_6F_5)_4B$—, $PF_6$— or $Rf_nF_{6-n}$ but is not limited thereto. Commercially available products include Irgacure 250, Irgacure 270, Irgacure 290, CPI-100P, CPI-101A, CPI-210S, Omnicat 440, Omnicat 550 and Omnicat 650, etc. These photopolymerization initiators may be used alone or in combination of two or more.

The content of the photopolymerization initiator is 1 to 10% by weight, preferably 2 to 7% by weight, and more preferably 3 to 5% by weight based on a total weight of the ink composition. If the content of the photopolymerization initiator is less than 1% by weight, the curing reaction may be insufficient, and if it exceeds 10% by weight, it may not be completely dissolved or the viscosity of the ink may increase so that the performance of inkjet process may be deteriorated.

Meanwhile, the ink composition according to the present invention may further comprise at least one of an adhesion promoter, a photosensitizer, or a surfactant, if necessary. The adhesion promoter can improve adhesion between the substrate and the printed layer. The adhesion promoter may be at least one selected from the group consisting of an alkoxysilane compound and a phosphate-based acrylate such as phosphate acrylate. Examples of the alkoxysilane compound include 3-glycidoxypropyl trimethoxysilane (KBM-403 (Shin-Etsu Chemical Co., Ltd., USA)), 3-glycidoxypropyl methyldimethoxysilane (KBM-402), 2-(3,4-epoxycyclohexyl)ethyltrimethoxysilane (KBM-303), 3-glycidoxypropyl methyldiethoxysilane (KBE-402), 3-glycidoxypropyl triethoxysilane (KBE-403), 3-methacryloxypropyl trimethoxysilane (KBM-503) and the like, and these may be used alone or in combination of two or more.

In case that the adhesion promoter is used, the content thereof is 1 to 5% by weight, preferably 2 to 4% by weight based on a total weight of the ink composition. If the content of the adhesion promoter is less than 1% by weight, adhesion between the substrate and the printed layer may be deteriorated. If it exceeds 5% by weight, the operation (rework) of removing the printed layer on the substrate may become difficult.

The photosensitizer may be used to complement the curing property at the active energy ray having long wavelength or to improve the effect of the photopolymerization initiator. Examples thereof include anthracene-based compounds such as anthracene, 9,10-dibutoxyanthracene, 9,10-dimethoxyanthracene, 9,10-diethoxyanthracene and 2-ethyl-9,10-dimethoxyanthracene; benzophenone-based compounds such as benzophenone, 4,4-bis(dimethylamino) benzophenone, 4,4-bis(diethylamino)benzophenone, 2,4,6-trimethylaminobenzophenone, methyl-o-benzoyl benzoate, 3,3-dimethyl-4-methoxybenzophenone and 3,3,4,4-tetra(t-butylperoxycarbonyl)benzophenone; ketone-based compound such as acetophenone, dimethoxyacetophenone, diethoxyacetophenone, 2-hydroxy-2-methyl-1-phenylpropan-1-one and propanone; perylene; fluorenone-based compounds such as 9-fluorenone, 2-chloro-9-fluorenone and 2-methyl-9-fluorenone; thioxanthone-based compounds such as thioxanthone, 2,4-diethyl thioxanthone, 2-chlorothioxanthone, 1-chloro-4-propyloxy thioxanthone, isopropylthioxanthone(ITX) and diisopropylthioxanthone; xanthone-based compounds such as xanthone and 2-methylxanthone; anthraquinone-based compounds such as anthraquinone, 2-methyl anthraquinone, 2-ethyl anthraquinone, t-butyl anthraquinone and 2,6-dichloro-9,10-anthraquinone; acridine-based compounds such as 9-phenylacridine, 1,7-bis(9-acridinyl)heptane, 1,5-bis(9-acridinylpentane) and 1,3-bis (9-acridinyl)propane; dicarbonyl compounds such as benzyl, 1,7,7-trimethyl-bicyclo[2,2,1]heptan-2,3-dione and 9,10-phenanthrenequinone; phosphine oxide-based compounds such as 2,4,6-trimethylbenzoyl diphenyl phosphine oxide and bis(2,6-dimethoxybenzoyl)-2,4,4-trimethylpentyl phosphine oxide; benzoate-based compounds such as methyl-4-(dimethylamino)benzoate, ethyl-4-(dimethylamino)benzoate and 2-n-butoxyethyl-4-(dimethylamino) benzoate; amino synergists such as 2,5-bis(4-diethylaminobenzal)cyclopentanone, 2,6-bis(4-diethylaminobenzal) cyclohexanone and 2,6-bis(4-diethylaminobenzal)-4-methyl-cyclopentanone; coumarine-based compounds such as 3,3-carbonylvinyl-7-(diethylamino)coumarine, 3-(2-benzothiazolyl)-7-(diethylamino)coumarine, 3-benzoyl-7-(diethylamino)coumarine, 3-benzoyl-7-methoxy-coumarine and 10,10-carbonylbis[1,1,7,7-tetramethyl-2,3,6,7-tetrahydro-1H,5H,11H—C1]-bezopyrano[6,7,8-i,j]-quinolizin-11-one; chalcone compounds such as 4-diethylamino chalcone and 4-azidobenzalacetophenone; 2-benzoylmethylene; and 3-methyl-b-naphtothiazoline. These compounds may be used alone or in combination of two or more.

In case that the photosensitizer is included in the ink composition, the content thereof is 0.1 to 3% by weight, preferably 0.5 to 2% by weight, and more preferably about 1% by weight based on a total weight of the ink composition. If the content of the photosensitizer is less than 0.1% by weight, a synergistic effect of curing sensitivity at a desired wavelength could not be expected. If it exceeds 3% by weight, the photosensitizer may not be dissolved and the adhesive strength and crosslinking density of the pattern may be lowered.

The surfactant controls the surface tension of the ink so that jetting can be smoothly performed and the ink spreads properly in the substrate. Examples thereof include Megafack F-444, F-475, F-478, F-479, F-484, F-550, F-552, F-553, F-555, F-570 and RS-75 from DIC(DaiNippon Ink & Chemicals), or Surflon S-111, S-112, S-113, S-121, S-131, S-132, S-141 and S-145 from Asahi Glass Co., Ltd., or Fluorad FC-93, FC-95, FC-98, FC-129, FC-135, FC-170C, FC-430 and FC-4430 from Sumitomo 3M Co., Ltd., or Zonyl FS-300, FSN, FSN-100 and FSO from DuPont, or BYK-306, BYK-310, BYK-320, BYK-330, BYK-331, BYK-333, BYK-342, BYK-350, BYK-354, BYK-355, BYK-356, BYK-358N, BYK-359, BYK-361N, BYK-381, BYK-370, BYK-371, BYK-378, BYK-388, BYK-392, BYK-394, BYK-399, BYK-3440, BYK-3441, BYK-UV3500, BYK-UV3530, BYK-UV3570, BYKETOL-AQ, BYK-DYNWET 800, BYK-SILCLEAN 3700 and BYK-UV 3570 from BYK, or Rad 2100, Rad 2011, Glide 100, Glide 410, Glide 450, Flow 370 and Flow 425 from TEGO, etc. These may be used singly or in combination of two or more.

In case that the surfactant is included in the ink composition, the content thereof is 0.1 to 5% by weight and preferably 0.5 to 3% by weight based on a total weight of the ink composition. If the content of the surfactant is less than 0.1% by weight, the effect of lowering the surface tension of the composition is insufficient, and coating failure occurs when the composition is coated on the substrate. If it exceeds 5% by weight, the surfactant is used in an excessive amount, resulting in a problem that the compatibility and defoaming property of the composition is rather reduced.

The infrared transmitting ink composition (or ink) for inkjet according to the present invention has a dose for curing of 20 to 5,000 mJ/cm$^2$, preferably 100 to 3,000 mJ/cm$^2$ and is cured by absorbing radiation in the wavelength range of 250 to 410 nm, preferably 360 to 410 nm. Furthermore, in order to be suitable for an inkjet process, it has a viscosity of, for example, 1 to 30 cP at 25° C., preferably 2 to 20 cP at a processing temperature. The adhesive force to the substrate without the post-process (heat treatment) is 4B or more in the cross cut test.

As described above, the infrared transmitting ink composition for inkjet according to the present invention is curable at ultraviolet ray having a long wavelength, and has light transmittance similar to that of a conventional carbon black pigment. However, the use of a lactam black pigment having a transmittance of 80% or more at an infrared wavelength of 850 to 940 nm makes it possible to check the alignment marks using an infrared camera and to detect the pressure mark by non-destructive inspection even after the bezel pattern is printed on the display substrate.

However, in order to improve the light-shielding property lowered due to using the lactam black pigment, the pigment is used in an amount of 10% by weight or more based on a total weight of the ink composition. But such amount of the pigment may deteriorate the performance of inkjet process. Therefore, in the present invention, in order to prevent this problem, an organic solvent satisfying a specific condition is used, which allows to improve the performance of inkjet process. In addition, by using the infrared transmitting ink composition for inkjet according to the present invention, the curing sensitivity of the ink is excellent as 2,000 mJ/cm$^2$ @ 1.8 μm and the adhesive force to the substrate without the post-process (heat treatment) is excellent. Lastly, there is an advantage in that while the adhesion force to the substrate is excellent, the rework ability of reusing the defective display panel by removing the printed bezel pattern is excellent.

Next, a method of forming a bezel pattern using the infrared transmitting ink for inkjet composition according to the present invention will be described. The method for forming a bezel pattern using the infrared transmitting ink composition for inkjet comprises the steps of: a) forming a bezel pattern by inkjet printing the infrared transmitting ink composition for inkjet on a substrate; and b) curing the bezel pattern by irradiation with radiation. The thickness of the cured bezel pattern may be from 1 to 3 μm. A detailed description thereof is based on the above description of the ink composition and the method of forming a bezel pattern using a conventional cationic polymerization ink composition.

Furthermore, the present invention provides a bezel pattern manufactured by using the infrared transmitting ink composition for inkjet, or a bezel pattern produced according to the method of forming the bezel pattern.

The present invention also provides a display substrate comprising the bezel pattern. The display may be used in any one of a Plasma Display Panel (PDP), a Light Emitting Diode (LED), an Organic Light Emitting Diode (OLED), a Liquid Crystal Display (LCD), a Thin Film Transistor-Liquid Crystal Display (LCD-TFT) and a Cathode Ray Tube (CRT).

Hereinafter, preferred embodiments of the present invention will be described in order to facilitate understanding of the present invention. However, the following examples are provided for illustrative purposes only, and it will be apparent to those skilled in the art that various modifications and variations can be made in the present invention without departing from the spirit or scope of the inventions. Such changes and modifications are intended to fall within the scope of the appended claims.

Example 1

Preparation of Infrared Transmitting Ink Composition for Inkjet

As shown in Table 1 below, based on total weight of the total ink composition, 12% by weight of lactam black (trade name: S0100CF, BASF AG, Germany) as a pigment, 2% by weight of an acrylic-based dispersant as a dispersant, 10% by weight of Celloxide 2021p (DAICEL Corporation, Japan) as an epoxy compound, 10% by weight of 1,4-cyclohexanedimethanol divinyl ether as a vinyl ether compound, 39% by weight of OXT-221 (TOAGOSEI Co., Ltd., Japan) as an oxetane compound, 20% by weight of butyl diglyme as an organic solvent, 2% by weight of KBM-303 (Shin-Etsu Silicone, Japan) as an adhesion promoter, 4% by weight of Irgacure 250 (BASF, USA) as a photopolymerization initiator, and 1% by weight of ITX (IHT Co., Ltd., China) as a photosensitizer were mixed and stirred for 5 hours to prepare an infrared transmitting ink composition for inkjet.

Example 2

Preparation of Infrared Transmitting Ink Composition for Inkjet

As shown in Table 1 below, an infrared transmitting ink composition for inkjet was prepared using the same composition and method as in Example 1 except that KBM-403 (Shin-Etsu Silicone, Japan) was used instead of KBM-303 as the adhesion promoter and CPI-210S (Japan) was used instead of Irgacure 250 as the photopolymerization initiator.

Example 3

Preparation of Infrared Transmitting Ink Composition for Inkjet

As shown in Table 1 below, an infrared transmitting ink composition for inkjet was prepared using the same composition and method as in Example 1 except that KBM-403 was used instead of KBM-303 as the adhesion promoter.

Example 4

Preparation of Infrared Transmitting Ink Composition for Inkjet

As shown in Table 1 below, an infrared transmitting ink composition for inkjet was prepared using the same composition and method as in Example 1 except that CPI-210S was used instead of Irgacure 250 as the photopolymerization initiator.

Example 5

Preparation of Infrared Transmitting Ink Composition for Inkjet

As shown in Table 1 below, an infrared transmitting ink composition for inkjet was prepared using the same composition and method as in Example 1 except that the content of lactam black used as the pigment was 10% by weight instead of 12% by weight, the content of OXT-221 used as the oxetane compound was 41% by weight instead of 39% by weight, KBM-403 was used instead of KBM-303 as the adhesion promoter.

Example 1 except that ethylene glycol monobutyl ether acetate (BCsA) was used instead of butyl diglyme as the organic solvent and KBM-403 was used instead of KBM-303 as the adhesion promoter.

Comparative Example 3

Preparation of Ink Composition

As shown in Table 2 below, an ink composition was prepared using the same composition and method as in Example 1 except that diethylene glycol monoethyl ether acetate (ECA) was used instead of butyl diglyme as the organic solvent and KBM-403 was used instead of KBM-303 as the adhesion promoter.

Comparative Example 4

Preparation of Ink Composition

As shown in Table 2 below, an ink composition was prepared using the same composition and method as in Example 1 except that triglyme (or triethylene glycol dim-

TABLE 1

|  |  | Example 1 | Example 2 | Example 3 | Example 4 | Example 5 |
|---|---|---|---|---|---|---|
| Black pigment | Lactam black | 12 | 12 | 12 | 12 | 10 |
|  | Carbon black | — | — | — | — | — |
| dispersant | Acrylic-based | 2 | 2 | 2 | 2 | 2 |
| Epoxy compound | Celloxide 2021p | 10 | 10 | 10 | 10 | 10 |
| Vinyl ether | 1,4-cyclohexane dimethanol divinyl ether | 10 | 10 | 10 | 10 | 10 |
| Oxetane compound | OXT-221 | 39 | 39 | 39 | 39 | 41 |
|  | OXT-212 | — | — | — | — | — |
| Organic solvent | Butyl diglyme | 20 | 20 | 20 | 20 | 20 |
|  | BCsA | — | — | — | — | — |
|  | ECA | — | — | — | — | — |
|  | triglyme | — | — | — | — | — |
| Adhesion promoter | KBM-303 | 2 | — | — | 2 | — |
|  | KBM-403 | — | 2 | 2 | — | 2 |
| Photopolymerization initiator | Irgacure 250 | 4 | — | 4 | — | 4 |
|  | CPI-210S | — | 4 | — | 4 | — |
| Photo sensitizer | ITX | 1 | 1 | 1 | 1 | 1 |

* Celloxide 2021p: (3',4'-epoxycyclohexane)methyl 3,4-epoxycyclohexyl carboxylate
* OXT-221: bis[1-ethyl (3-oxetanyl)]methyl ether
* OXT-212: 3-ethyl-3-[(2-ethylhexyloxy)methyl]oxetane
* BCsA: ethylene glycol monobutyl ether acetate
* ECA: diethylene glycol monoethyl ether acetate
* KBM-303: 2-(3,4-epoxycyclohexyl) ethyltrimethoxysilane
* KBM-403: 3-glycidoxypropyl trimethoxysilane

Comparative Example 1

Preparation of Ink Composition

As shown in Table 2 below, an ink composition was prepared using the same composition and method as in Example 1 except that the carbon black was used instead of the lactam black as the pigment and KBM-403 was used instead of KBM-303 as the adhesion promoter.

Comparative Example 2

Preparation of Ink Composition

As shown in Table 2 below, an ink composition was prepared using the same composition and method as in ethyl ester) was used instead of butyl diglyme as the organic solvent and KBM-403 was used instead of KBM-303 as the adhesion promoter.

Comparative Example 5

Preparation of Ink Composition

As shown in Table 2 below, an ink composition was prepared using the same composition and method as in Example 1 except that the organic solvent was not used, 20% by weight of OXT-212 was used in addition to 39% by weight of OXT-221 as the oxetane compound and KBM-403 was used instead of KBM-303 as the adhesion promoter.

Comparative Example 6

Preparation of Ink Composition

As shown in Table 2 below, an ink composition was prepared using the same composition and method as in Example 1 except that the content of OXT-221 used as the oxetane compound was changed to 40% by weight and 1% by weight of KBM-403 was used instead of 2% by weight of KBM-303 as the adhesion promoter.

Comparative Example 7

Preparation of Ink Composition

As shown in Table 2 below, an ink composition was prepared using the same composition and method as in Example 1 except that the content of OXT-221 used as the oxetane compound was changed to 36% by weight and 5% by weight of KBM-403 was used instead of 2% by weight of KBM-303 as the adhesion promoter.

The transmittance of the sample was measured for a wavelength of 380 to 1,000 nm using a UV-VIS spectrometer. For the curing sensitivity, it was examined whether curing was possible at 1,000 mJ/cm$^2$ using a UV LED lamp of 395 nm wavelength. For the performance of inkjet process, jetting was evaluated according to the short purse (3s) and the idle time after wiping, while all nozzles were ejected. For the adhesion force to the bottom, a cross cut test (Specification: ASTM D3002, D3359) was carried out to measure the adhesion force, and the result was graded from OB to 5B. The rework performance was evaluated with an abrasion & rubbing tester by applying a load of 2 kg to wiper (CF-909) and then supplying acetone to check whether the bezel layer was removed within 20 reciprocations (speed: 30 reciprocations/min). In the evaluation of curing sensitivity and rework performance in the following Tables 3 and 4, the ○ means excellent, and the X means not excellent.

TABLE 2

| | | Comp. Exam. 1 | Comp. Exam. 2 | Comp. Exam. 3 | Comp. Exam. 4 | Comp. Exam. 5 | Comp. Exam. 6 | Comp. Exam. 7 |
|---|---|---|---|---|---|---|---|---|
| Black pigment | Lactam black | — | 12 | 12 | 12 | 12 | 12 | 12 |
| | Carbon black | 12 | — | — | — | — | — | — |
| dispersant | Acrylic-based | 2 | 2 | 2 | 2 | 2 | 2 | 2 |
| Epoxy compound | Celloxide 2021p | 10 | 10 | 10 | 10 | 10 | 10 | 10 |
| Vinyl ether | 1,4-cyclohexane dimethanol divinyl ether | 10 | 10 | 10 | 10 | 10 | 10 | 10 |
| Oxetane compound | OXT-221 | 39 | 39 | 39 | 39 | 39 | 40 | 36 |
| | OXT-212 | — | — | — | — | 20 | — | — |
| Organic solvent | Butyl diglyme | 20 | — | — | — | — | 20 | 20 |
| | BCsA | — | 20 | — | — | — | — | — |
| | ECA | — | — | 20 | — | — | — | — |
| | triglyme | — | — | — | 20 | — | — | — |
| Adhesion promoter | KBM-303 | — | — | — | — | — | — | — |
| | KBM-403 | 2 | 2 | 2 | 2 | 2 | 1 | 5 |
| Photopolymerization initiator | Irgacure 250 | 4 | 4 | 4 | 4 | 4 | 4 | 4 |
| | CPI-210S | — | — | — | — | — | — | — |
| Photo sensitizer | ITX | 1 | 1 | 1 | 1 | 1 | 1 | 1 |

Evaluation of Physical Properties of Samples Prepared from the Ink Composition of Examples 1 to 5 and Comparative Examples 1 to 7

The ink composition prepared in Examples 1 to 5 and Comparative Examples 1 to 7 was inkjet-printed onto a square glass having a size of 50 mm in width, 50 mm in length and 0.5 μm in thickness at an optical density (OD) of 0.9 using X-rite 341C to prepare the sample. Then, the thickness, the transmittance, the curing sensitivity, the performance of inkjet process (idle time), the adhesion force to the bottom and the rework performance were evaluated. The results are shown in Tables 3 and 4 below.

TABLE 3

| | Exam. 1 | Exam. 2 | Exam. 3 | Exam. 4 | Exam. 5 |
|---|---|---|---|---|---|
| Thickness (μm) | 1.9 | 1.9 | 1.9 | 1.9 | 2.3 |
| Transmittance (800 nm) | 84% | 84% | 84% | 84% | 84% |
| Curing sensitivity | ○ | ○ | ○ | ○ | ○ |
| Performance of inkjet process | 20 min. | 20 min. | 20 min. | 20 min. | 20 min. |
| Adhesion force to the bottom | 5B | 5B | 5B | 5B | 5B |
| Rework performance | ○ | ○ | ○ | ○ | ○ |

TABLE 4

|  | Comp. Exam. 1 | Comp. Exam. 2 | Comp. Exam. 3 | Comp. Exam. 4 | Comp. Exam. 5 | Comp. Exam. 6 | Comp. Exam. 7 |
|---|---|---|---|---|---|---|---|
| Thickness (μm) | 1.1 | 1.8 | 1.9 | 1.9 | 3.1 | 1.9 | 1.9 |
| Transmittance (800 nm) | 18% | 84% | 84% | 84% | 84% | 84% | 84% |
| Curing sensitivity | ○ | ○ | X | X | ○ | ○ | ○ |
| Performance of inkjet process | 20 min. | 5 min. | 20 min. | 20 min. | 20 min. | 20 min. | 20 min. |
| Adhesion force to the bottom | 5B | 5B | 5B | 5B | 5B | 0B | 5B |
| Rework performance | ○ | ○ | ○ | ○ | ○ | ○ | X |

Experimental Example 1

Evaluation of Thickness

Unlike Examples 1 to 4 in which the content of the lactam black pigment is 12% by weight, in the case of Example 2 in which the content of the lactam black pigment is reduced to 10% by weight, the thickness of the sample (i.e., the bezel) was slightly increased to 2.3 μm. But this thickness is 3 μm or less, which was suitable for the present invention. It was confirmed that other physical properties were same as those of Examples 1 to 4, so that there was no problem in reliability. Therefore, it was found that when the content of lactam black pigment was maintained at 10% by weight or more, it meets the spirit of the present invention.

On the other hand, in the case of Comparative Example 5 in which an organic solvent was not used, the bezel had a thickness exceeding 3 μm (i.e., 3.1 μm), so that there is a possibility that a problem in reliability arises when the film was attached to the top of the bezel. Therefore, it was found that the organic solvent should be included in the ink composition according to the present invention.

Experimental Example 2

Evaluation of Transmittance

FIG. 1 is a graph comparing infrared transmittances of a bezel formed of ink composition according to an example according to the present invention and a comparative example. The infrared transmittance (blue graph of FIG. 1) of Example 3 using the lactam black as a black pigment was about 84% at the wavelength band of 800 nm. In contrast, the infrared transmittance (red graph of FIG. 1) of Comparative Example 1 using carbon black as the pigment was remarkably lowered to 18%. From this, it was confirmed that the lactam black should be included in the ink composition according to the present invention as a pigment.

Experimental Example 3

Evaluation of Performance of Inkjet Process and Curing Sensitivity

In the case of Example 3 in which butyl diglyme was used as the organic solvent, the idle time was 20 minutes and the performance of inkjet was excellent. In contrast, in the case of Comparative Example 2 using ethylene glycol monobutyl ether acetate (BCsA) instead of butyl diglyme as the organic solvent, it was confirmed that the idle time was 5 minutes or less and the performance of inkjet process was insufficient.

In addition, in Comparative Example 3 in which diethylene glycol monoethyl ether acetate (ECA) was used instead of butyl diglyme as the organic solvent and Comparative Example 4 in which triglyme was used instead of butyl diglyme as the organic solvent, the idle time was 20 minutes and the performance of inkjet process was excellent, but the curing sensitivity was not good. Therefore, as can be seen from these results, it is understood that the ink composition according to the present invention should contain an organic solvent such as butyl diglyme, which satisfies a specific boiling point and viscosity (in particular, boiling point of 220° C. or higher). FIG. 2 is an inkjet printed image for evaluating performance of inkjet process of the ink composition prepared in an example according to the present invention and a comparative example. In the printed image of Example 3, there is no difference between initial jetting and jetting after 20 minutes passed, so that the inkjet processability is excellent in Example 3. However, in the printed image of Comparative Example 2, the initial state of jetting was good, but after 10 minutes passed, the jetted drops were considerably reduced due to the drying of the nozzles, and the inkjet processability was insufficient.

Experimental Example 4

Evaluation of Adhesion Force to the Bottom

FIG. 3 is a view showing how the degree of cross cut varies according to the content of the adhesion promoter contained in the ink composition of an example according to the present invention and a comparative example. In the case of Example 3 in which 2% by weight of KBM-403 was used as the adhesion promoter, the result of the cross-cut test was excellent as a 5B level. In contrast, in the case of Comparative Example 6 in which 1% by weight of KBM-403 was used, the result of the cross cut test was poor as 0B, which is similar to the case where the adhesion promoter was not used as shown in FIG. 3. However, it was found that in comparative Example 7 using 5% by weight of KBM-403 as the adhesion promoter, the adhesion force was superior to that in Example 3 in which KBM-403 was used in an amount of 2% by weight. From this, it can be understood that when the adhesion promoter is used in an amount of about 2% or more in the ink composition according to the present invention, the adhesion to the substrate is further improved.

Experimental Example 5

Evaluation of Rework Performance

FIG. 4 is a view showing rework performance according to the content of the adhesion promoter contained in the ink composition of an example according to the present invention and a comparative example. In the case of Example 3 in which 2% by weight of KBM-403 was used as the adhesion promoter, the bezel was removed after only 10 reciprocations. In contrast, in the case of Comparative Example 7 in which 5% by weight of KBM-403 was used, it was confirmed that removal of the bezel was not easy even after 50 reciprocations. Therefore, from combining the evaluation of the adhesion force to the bottom and the evaluation of the rework performance, it is understood that the adhesion promoter should be used in an amount of at least 2% by weight and less than 5% by weight.

What is claimed is:

1. An infrared transmitting ink composition for inkjet, comprising a lactam black pigment; a dispersant; an epoxy compound; a vinyl ether compound; an oxetane compound; a photopolymerization initiator; and an organic solvent having a boiling point of 200° C. or higher and a viscosity of 1 to 5 cP at 25° C.,
wherein the organic solvent is selected from the group consisting of butyl diglyme, ethylene glycol dibutyrate, diethyl succinate, and ethyl caprate,
wherein the infrared transmitting ink composition does not contain carbon black,
wherein a content of the organic solvent is 10 to 30% by weight based on a total weight of the ink composition, and
wherein a content of the lactam black pigment is 5 to 15% by weight based on the total weight of the ink composition.

2. The infrared transmitting ink composition according to claim 1, wherein a content of the dispersant is 0.5 to 5% by weight based on the total weight of the ink composition.

3. The infrared transmitting ink composition according to claim 1, wherein a content of the epoxy compound is 5 to 25% by weight based on the total weight of the ink composition.

4. The infrared transmitting ink composition according to claim 1, wherein a content of the vinyl ether compound is 1 to 15% by weight based on the total weight of the ink composition.

5. The infrared transmitting ink composition according to claim 1, wherein a content of the oxetane compound is 25 to 50% by weight based on the total weight of the ink composition.

6. The infrared transmitting ink composition according to claim 1, wherein a content of the photopolymerization initiator is 1 to 10% by weight based on the total weight of the ink composition.

7. The infrared transmitting ink composition according to claim 1, wherein the dispersant is selected from the group consisting of acrylics, polyalkylene glycols and esters thereof, polyoxyalkylene polyhydric alcohols, ester alkylene oxide adducts, alcohol alkylene oxide adducts, sulfonic acid esters, sulfonates, carboxylic acid esters, carboxylates, alkylamide alkylene oxide adducts, alkylamines and a mixture thereof.

8. The infrared transmitting ink composition according to claim 1, wherein the epoxy compound is one or a mixture of two selected from the group consisting of dicyclopentadiene dioxide, limonene dioxide, (3,4-epoxycyclohexyl)methyl-3,4-epoxycyclohexanecarboxylate, 3-vinylcyclohexene oxide, bis(2,3-epoxycyclopentyl)ether, bis(3,4-epoxycyclohexylmethyl)adipate, bis(3,4-epoxy-6-methylcyclohexylmethyl)adipate, (3,4-epoxycyclohexyl)methyl alcohol, (3,4-epoxy-6-methylcyclohexyl)methyl-3,4-epoxy-6-methylcyclohexanecarboxylate, ethylene glycol bis(3,4-epoxycyclohexyl)ether, 3,4-epoxycyclohexene carboxylic acid ethylene glycol diester and (3,4-epoxycyclohexyl)ethyltrimethoxy silane.

9. The infrared transmitting ink composition according to claim 1, wherein the vinyl ether compound is selected from the group consisting of 1,4-cyclohexanedimethanol divinyl ether, triethylene glycol divinyl ether, and hydroxybutyl vinyl ether.

10. The infrared transmitting ink composition according to claim 1, wherein the oxetane compound is selected from the group consisting of 3-ethyl-3-hydroxymethyl oxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, 3-ethyl-3-(2-ethylhexyloxymethyl)oxetane, 3-ethyl-3-cyclohexyloxymethyl oxetane, phenol novolac oxetane, and a mixture thereof.

11. The infrared transmitting ink composition according to claim 1, wherein the photopolymerization initiator comprises at least one of an iodonium salt or a sulfonium salt.

12. The infrared transmitting ink composition according to claim 1, wherein the ink composition further comprises an adhesion promoter in a content of 1 to 5% by weight based on the total weight of the ink composition.

13. The infrared transmitting ink composition according to claim 12, wherein the adhesion promoter is at least one selected from a phosphate-based acrylate or an alkoxysilane compound selected from the group consisting of 3-glycidoxypropyl trimethoxysilane, 3-glycidoxypropyl methyldimethoxysilane, 2-(3,4-epoxycyclohexyl)ethyltrimethoxysilane, 3-glycidoxypropyl methyldiethoxysilane, 3-glycidoxypropyl triethoxysilane, 3-methacryloxypropyl trimethoxysilane, and a mixture thereof.

14. A method for forming a bezel pattern comprising the steps of:
a) inkjet printing the infrared transmitting ink composition according to claim 1 on a substrate to form a bezel pattern; and
b) curing the bezel pattern by irradiation with radiation.

15. The method for forming a bezel pattern according to claim 14, wherein the cured bezel pattern has a thickness of 1 to 3 μm.

16. A bezel pattern manufactured according to the method of claim 14.

17. A display substrate comprising the bezel pattern according to claim 16.

* * * * *